(12) United States Patent
Moll (10) Patent No.: US 11,758,273 B2
(45) Date of Patent: Sep. 12, 2023

(54) CAMERA DEVICE FOR GENERATING AN IMAGE OF SURROUNDINGS

(71) Applicant: AUDI AG, Ingolstadt (DE)

(72) Inventor: Tobias Moll, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/628,442

(22) PCT Filed: Aug. 11, 2020

(86) PCT No.: PCT/EP2020/072502
§ 371 (c)(1),
(2) Date: Jan. 19, 2022

(87) PCT Pub. No.: WO2021/037556
PCT Pub. Date: Mar. 4, 2021

(65) Prior Publication Data
US 2022/0272258 A1 Aug. 25, 2022

(30) Foreign Application Priority Data
Aug. 29, 2019 (DE) .................... 10 2019 212 988.9

(51) Int. Cl.
*B60R 1/23* (2022.01)
*H04N 23/698* (2023.01)
(Continued)

(52) U.S. Cl.
CPC ......... *H04N 23/698* (2023.01); *G02B 6/4206* (2013.01); *H04N 23/55* (2023.01); *B60R 1/23* (2022.01); *B60R 2300/10* (2013.01); *B60R 2300/20* (2013.01); *G03H 1/0248* (2013.01)

(58) Field of Classification Search
None
See application file for complete search history.

(56) References Cited

U.S. PATENT DOCUMENTS 8,325,166 B2    12/2012  Akutsu et al.
8,519,325 B1 *  8/2013   Lu ..................... G02B 19/0095
                                             136/246
(Continued)

FOREIGN PATENT DOCUMENTS

DE    10 2016 211 823 A1    1/2018
DE    10 2017 217 193 A1    3/2019
(Continued)

OTHER PUBLICATIONS

International Search Report (PCT/ISA/210) with Written Report (opinion) of the International Research Authority (PCT/ISA/237) dated Oct. 19, 2022 in International Application No. PCT/EP2020/072502 (23 pages including translation—first two pages are WIPO translation and pp. 3-9 are machine translation).
(Continued)

*Primary Examiner* — Eileen M Adams
(74) *Attorney, Agent, or Firm* — STAAS & HALSEY LLP (57) ABSTRACT

A camera device having an enlarged or wide-angle field of view generates images of surroundings simultaneously using only one image capturing unit, such as an image sensor, for example. The camera device uses a diverting unit disposed upstream of the image capturing unit. The diverting unit includes so-called holographic optical elements which, based on their deflection structures, divert or deflect light so that the camera device can capture the wide-angle field of view, without generating imaging aberrations on the resulting image(s). The deflection structures are wavelength-selective and/or angle-selective. The total field of view is subdivided into individual angle-of-incidence regions by virtue of the properties of the deflection structures.

20 Claims, 3 Drawing Sheets

(51) Int. Cl.
  *G02B 6/42*   (2006.01)
  *H04N 23/55*  (2023.01)
  *G03H 1/02*   (2006.01)

(56) References Cited

U.S. PATENT DOCUMENTS

| | | |
|---|---|---|
| 2007/0070504 A1 | 3/2007 | Akutsu et al. |
| 2008/0180537 A1 | 7/2008 | Weinberg et al. |
| 2009/0174919 A1 | 7/2009 | Moss |
| 2017/0026570 A1* | 1/2017 | Shepard ............... H04N 13/161 |
| 2018/0275350 A1 | 9/2018 | Oh et al. |
| 2020/0241189 A1* | 7/2020 | Schabacker ............ G02B 6/001 |

FOREIGN PATENT DOCUMENTS

| | | |
|---|---|---|
| DE | 10 2019 212 988.9 | 8/2019 |
| JP | 4-86617 A | 3/1992 |
| WO | PCT/EP2020/072502 | 8/2020 |

OTHER PUBLICATIONS

German Examination Report dated Jun. 2, 2020 in German Patent Application No. 10 2019 212 988.9 (10 pages).
International Preliminary Reporton Patentability dated Jan. 18, 2022 in International Application No. PCT/EP2020/072502 (23 pages, including translation—first two pages are WIPO translation and pp. 3-9 are machine translation).

* cited by examiner

CAMERA DEVICE FOR GENERATING AN IMAGE OF SURROUNDINGS

CROSS REFERENCE TO RELATED APPLICATIONS

This application is a U.S. national stage of International Application No. PCT/EP2020/072502, filed on Aug. 11, 2020. The International Application claims the priority benefit of German Application No. 10 2019 212 988.9 filed on Aug. 29, 2019. Both International Application No. PCT/EP2020/072502 and German Application No. 10 2019 212 988.9 are incorporated by reference herein in their entirety.

BACKGROUND

Described herein is a camera device for generating at least one image of surroundings. Furthermore, also described herein is a motor vehicle including such a camera device.

A camera or camera device, such as a photographic or video camera, for example, generally has an image sensor and an imaging optical unit arranged upstream thereof in order to generate an image of surroundings. The imaging optical unit is also referred to as a lens and usually includes one lens element or a lens element system including a plurality of lens elements. It serves for focusing the light from the surroundings and thus for directing or diverting the light onto the image sensor in a focused manner, such that a desired object from the surroundings is imaged sharply on the image sensor. In this case, a design of the image sensor, in particular the dimensioning or sensor size thereof, and/or of a focal length of the lens define a field of view (FOV) and thus a viewing angle of the camera. In this case, the field of view is taken to mean that region in the surroundings which can be captured by the camera and imaged on the image sensor.

U.S. Patent Application Publication No. 2008/0180537 A1 describes for example a camera system having an orientation unit, which enables a user to identify the field of view of a camera.

Furthermore, U.S. Patent Application Publication No. 2018/0338089 describes a camera module for normal and infrared photography. In order to improve the quality of a resulting image of the surroundings, here provision is made for restricting a viewing angle, i.e. the field of view of the camera module during normal photography.

For virtual reality or augmented reality applications and in motor vehicles, however, wide-angle camera systems, in particular cameras having a field of view or viewing angle of greater than 60 degrees, are being demanded more and more often. The intention is thereby to cover or capture the largest possible region in the surroundings. So-called wide-angle lenses are frequently used for this purpose. However, the latter have the disadvantage that they are relatively large and have a markedly curved lens element. This can result in unwanted reflections of the light from the surroundings at the lens element, particularly at the edges of the field of view, as a result of which the field of view would be restricted. Moreover, in this case severe optical distortions frequently arise, for example a barrel distortion or a chromatic aberration, as they can lead to image aberrations on the resulting image.

As an alternative to a camera with a wide-angle lens, a plurality of individual cameras could also be used in order to capture the largest possible field of view. The individual cameras can accordingly be arranged next to one another, such that their fields of view adjoin one another and an image with a large field of view arises when the individual images or individual recordings are combined. What is disadvantageous about this method, however, is that it is necessary to provide a plurality of installation locations for the individual cameras. Moreover, individual images have to be recorded in a synchronized manner or exactly simultaneously in order that the enlarged field of view can be captured. In addition, using many individual cameras increases the costs of such a camera system.

SUMMARY

Described herein is a camera device which enables cost-effective recording of an image of surroundings with an enlarged field of view.

This may be achieved by the camera device described herein. Advantageous developments of the disclosure are described by the following description, drawings, and the claims.

One or more aspects of the disclosure are based on the insight that a corresponding camera device can be provided by use of holographic optical elements (HOEs). For example, an HOE can completely or partly simulate the optical function of a lens, that is to say of a system of lens elements. In other words, the HOE can be used to divert or deflect light from the surroundings to be imaged to the image capturing unit, that is to say the image sensor, for example. For the purpose of deflecting or diverting the light, in this case, an HOE has a deflection structure, for example in the form of an optical grating. In this case, HOEs have the advantage that they can be embodied such that they are selective or sensitive for different wavelengths and/or different angle-of-incidence regions depending on the configuration of the deflection structure. They are thus angle-selective and/or wavelength-selective. The property of the wavelength selectivity of HOEs is also known from Japanese Patent Application 40 866 617 A, for example. In the camera device described herein, then, two or more of such HOEs, each being selective for different angle-of-incidence regions, are used in order to enlarge the field of view of the camera device. The enlarged field of view of the camera device is thus composed of the angle-of-incidence regions, i.e. the individual fields of view of the HOEs. The production and function of an HOE will be explained in greater detail again later in the course of the description.

In order to generate the at least one image of the surroundings, the camera device has a light guiding medium, for example a plate or sheet composed of glass or plastic, which is embodied as an optical waveguide. An input coupling region and an output coupling region are arranged at the light guiding medium, for example along a direction of the longitudinal extent of the light guiding medium. The input coupling region has at least two input coupling deflection structures, that is to say for example two of the HOEs, each of which is configured to couple into the light guiding medium light in a predefined spectral range, the light being incident on the respective deflection structure from a respectively predefined angle-of-incidence region from the surroundings. In this case, each of the deflection structures is embodied such that it is selective or sensitive vis a vis a different spectral range and angle-of-incidence region with respect to the other deflection structures. The light guiding medium then performs the function of forwarding the coupled-in light. In this case, the light guiding medium is configured to transmit the coupled-in light from the input coupling region to the output coupling region by internal reflection. Analogously to the input coupling region, the output coupling region, too, has at least two output coupling deflection structures. The at least two output coupling deflection structures are configured to couple out from the light guiding medium the light in the predefined spectral range coupled in by a respective one of the input coupling deflection structures, the light being incident on the respective output coupling deflection structure. In this case, each of the output coupling deflection structures is for example assigned to a respective one of the input coupling deflection structures. That is to say that they couple out only the from the respectively assigned input coupling deflection structure. Accordingly, the at least two output coupling deflection structures are advantageously selective or sensitive vis a vis the same spectral ranges as the at least two input coupling deflection structures.

The light guiding medium with the input coupling region and the output coupling region can thus be understood as a diverting unit for the light from the surroundings. The offset arrangement of the input coupling region and the output coupling region thus results in an offset of an optical axis of the coupled-in light and of the coupled-out light.

In order to capture the light diverted by the diverting unit, the image capturing unit mentioned above is additionally provided as well. The image capturing unit is arranged at the output coupling region. The image capturing unit can be embodied for example as an image sensor, such as a CCD or CMOS sensor. Alternatively, the image capturing unit can also be embodied as a camera having a lens. The diverting unit is thus disposed upstream of the image capturing unit. In order to capture the coupled-out light, the image capturing unit has at least two capture regions. The at least two capture regions are assigned, for example, respectively to one of the at least two output coupling deflection structures. Consequently, each of the capture regions is configured to capture the light coupled out by a respective one of the output coupling deflection structures, and the image capturing unit is configured to generate image data from the captured light. For each of the capture regions, a separate image data set can thus be generated by the image capturing unit. In this case, the image data or image data sets differ in their spectral ranges and angle-of-incidence regions. From these image data, subsequently the at least one desired image of the surroundings, that is to say one or more images of the surroundings, can be generated or provided.

To summarize, therefore, a camera device is proposed which makes it possible to capture simultaneously a wide-angle recording or a plurality of individual recordings with different fields of view from the surroundings. The diverting unit being described can thus constitute a kind of wide-angle or multi-view special lens based on holographic optical elements as an imaging optical unit. The camera device can thus be provided particularly cost-effectively for capturing the largest possible field of view.

The disclosure also includes embodiments which result in additional advantages.

In an example embodiment it is provided that the camera device furthermore has a computing unit configured to provide respectively separate images from the generated image data. That is to say that the diverting unit is thus embodied as a multi-view lens. As a result, a plurality of recording regions or fields of view can be recorded by the camera device. An image of the surroundings is thus generated per image data set. In this case, the images differ at least partly in their represented field of view. Consequently, with just one camera device, that is to say for example with just one image capturing unit, requiring little structural space and in a cost-effective manner, it is possible to provide a camera device which can capture a plurality of recording regions (multi-view) or fields of view. In this case, the individual images can be provided as color images according to their respective spectral range or as black-and-white images or grayscale images.

In an additional or alternative embodiments, it is provided that the computing unit of the camera device is configured to provide a common image of the surroundings from the generated image data. That is to say that the diverting unit can form a wide-angle lens based on HOEs. In this case, the field of view of the camera device can be composed of the individual fields of view provided by the angle selectivity of the deflection structures. In this case, the fields of view, i.e. also the angle-of-incidence regions, can at least partly overlap. Consequently, by use of the image capturing unit, the different image data or image data sets that were generated depending on the angle-of-incidence regions and respectively different fields of view can be merged and a common image of the surroundings can be calculated therefrom. The common image of the surroundings can for example be provided as a black-and-white image or grayscale image.

A configuration of the deflection structures and thus also the production and function of HOEs will now be described in greater detail in the following embodiments.

An example embodiment provides for at least one optical grating, for example a surface holographic grating or a volume holographic grating, to be provided as respective deflection structure.

An optical grating, also called diffraction grating, and its mode of operation and production method are generally known. In principle, an optical grating can be embodied as structures which are periodic at least in sections, so-called grating structures, in a substrate. By use of the grating structure, an optical grating can employ the physical effect of diffraction to bring about light guiding, as is known for example from mirrors, lens elements, or prisms. If light is incident on the optical grating, i.e. if light rays are incident thereon, the incident light rays satisfying the Bragg equation for example, the light rays are diffracted or deflected by the optical grating. The light guiding can thus be effected for example by interference phenomena of the light rays diffracted by the optical grating. The deflection structure of the input coupling region or output coupling region can accordingly also be referred to as a diffraction structure.

For example, an optical grating can be embodied in a directionally selective manner or in an angularly selective manner vis-à-vis the incident light. Thus, only light, for example a portion of the light, which is incident on an optical grating from a predetermined direction of incidence, for example at a predetermined angle, can be deflected. Light, for example a portion of the light, which is incident on the optical grating from a different direction is for example not deflected, or to a lesser extent, the greater the difference relative to the predetermined direction of incidence. That portion of light which deviates from the predetermined direction of incidence or optimum direction of incidence can thus for example propagate through the substrate with the optical grating in an unimpeded manner.

Additionally or alternatively, an optical grating can also be embodied in a wavelength-selective manner or in a frequency-selective manner. Thus, only light, for example a first portion of the light, having a predetermined wavelength can be deflected or diffracted at a specific diffraction angle by the optical grating. Light, for example a second portion of the light, having a different wavelength than the predetermined wavelength is for example not deflected, or to a lesser extent, the greater the difference relative to the predetermined wavelength. The second portion of light, deviating from the predetermined wavelength or optimum wavelength, can thus for example propagate through the substrate with the optical grating in an unimpeded manner. As a result, for example, at least one monochromatic light portion can be split off from polychromatic light that impinges on the optical grating. Advantageously, the deflection effect is maximal for the optimum wavelength and decreases or becomes weaker toward longer and shorter wavelengths, for example in accordance with a Gaussian bell. For example, the deflection effect acts only on a fraction of the visible light spectrum and/or in an angular range of less than 90 degrees.

An optical grating can be produced for example by the exposure of a substrate, that is to say for example photolithographically or holographically. In this context, the optical grating can then also be referred to as a holographic grating or a holographic optical grating. Two types of holographic optical gratings are known: surface holographic gratings (for short: SHG) and volume holographic gratings (for short: VHG). In the case of a surface holographic grating, the grating structure can be produced by optical deformation of a surface structure of the substrate. Impinging light can be deflected, for example reflected, by the altered surface structure. Examples of surface holographic gratings are so-called sawtooth or blazed gratings. In contrast thereto, the grating structure in the case of volume holographic gratings can be incorporated into the entire volume or a partial region of the volume of the substrate. Surface holographic gratings and volume holographic gratings are generally frequency-selective. However, optical gratings that can diffract polychromatic light are also known. These optical gratings are referred to as multiplexed volume holographic gratings (for short: MVHG) and can be produced for example by altering the periodicity of the grating structure of an optical grating or by arranging a plurality of volume holographic gratings one behind another.

Suitable material for the substrate for incorporating an optical grating is for example a polymer, for example a photopolymer, or a film, for example a photosensitive film, for example composed of plastic or organic substances. In order to use such substrates for the flexible camera device, it should additionally be taken into consideration that the material, for example in substrate form, has flexible and light-waveguiding properties. Substrates having a deflection structure for diffracting light, for example in the form of an optical grating, can also be referred to as holographic optical elements (HOEs).

In a further embodiment it is provided that the deflection structures are embodied integrally with the light guiding medium. The at least two input coupling and the at least two output coupling deflection structures can thus be incorporated for example directly into a surface structure or a volume of the light guiding medium. That is to say that the respective deflection structure can be introduced into a surface of the light guiding medium by etching or laser treatment, for example. The light guiding medium itself can thus be embodied as an HOE.

An alternative embodiment thereto provides for the deflection structures to be embodied in at least one separate element with respect to the light guiding medium. That is to say that the input coupling deflection structures, the output coupling deflection structures and the light guiding medium can be embodied in separate substrates or elements. For example, the input coupling deflection structures can form a first element, the output coupling deflection structures can form a second element, and the light guiding medium can form a third element, against which the first and second elements bear. The deflection structures can thus be embodied in at least one HOE. By way of example, the input coupling and output coupling deflection structures can be embodied in different sections of a holographic film or plate. In order to secure the film or plate to the light guiding medium, the film or plate can be adhesively bonded onto the carrier medium. Alternatively, the holographic film can also be embodied as an adhesion film and adhere to the surface of the light guiding medium directly, that is to say without an adhesive, by way of molecular forces.

In a further embodiment it is provided that the input coupling deflection structures are embodied serially one after another in relation to a direction of incidence of the light. In other words, the input coupling deflection structures can be arranged in a manner stacked one above another, their areas for example completely overlapping. As an alternative thereto, in a further embodiment it is provided that the input coupling deflection structures are embodied in a planar fashion next to one another in the input coupling region. To put it another way, the input coupling deflection structures can be arranged in a plane next to one another, their areas for example not overlapping.

In a further embodiment it is provided that each of the input coupling deflection structures has an area which is embodied such that it is larger than a respective area of the at least two output coupling deflection structures. Consequently, the input coupling region can also have a larger area than the output coupling region. For example, an area of the respective input coupling deflection structure can be larger than an area of the respective output coupling deflection structure by a factor of 2.

In order to deflect the light from the surroundings, in this case, the input coupling region can have a focusing structure as respective input coupling deflection structure. By use of the focusing structure, the light impinging from the surroundings can be diverted to the output coupling region in a focused manner by way of the light guiding medium. The respective optical grating of the respective output coupling deflection structure can accordingly be embodied as a focusing grating. To put it another way, in a further embodiment, each of the input coupling deflection structures is embodied as an optical grating having a focusing grating structure. The focusing grating structure deflects light beams of the light to be diverted, the light impinging on the respective input coupling deflection structure from the surroundings, to different extents depending on a location of incidence. Consequently, the respective input coupling deflection structure focuses or converges the light beams toward the respective output coupling deflection structure. For example, the output coupling region can furthermore have a diverging structure as respective output coupling deflection structure. By use of the diverging structure, the focused light, for example a beam of the light focused by the respective input coupling deflection structure, for example a beam path of the light, upon deflection at the diverging structure, can be parallelized or straightened out of the carrier medium in order to be captured by the image capturing unit. The optical grating of the respective output coupling deflection structure can thus accordingly be embodied as a diverging grating. To put it another way, in this embodiment it is provided that the at least two output coupling deflection structures are embodied as an optical grating having a diverging grating structure. The diverging grating structure deflects light beams of the coupled-in light, the light impinging on the respective output coupling deflection structure, to different extents depending on a location of incidence. The respective output coupling deflection structure thereby parallelizes the light beams for capture by the image capturing unit. The light beams thus pass parallel to one another for capture by the image capturing unit.

This results in light focusing of the light from the surroundings, such that a light intensity that impinges on the image sensor of the image capturing unit can be increased.

In order to realize a focusing grating or a diverging grating, for example an inhomogeneous grating structure, for example a grating structure that is aperiodic in sections, can be incorporated into the substrate described. Alternatively, a plurality of diffraction gratings having identical or different grating structures can also be arranged or disposed next to one another or one behind another.

In a further embodiment it is provided that the image capturing unit has a color image sensor for capturing the coupled-out light. To put it another way, the image capturing unit can have a color filter unit that enables the captured light to be separated according to wavelengths or spectral ranges. The color filter unit can function according to the Bayer principle or the Foveon principle, for example. The color image sensor is thus configured for example as a Bayer sensor or Foveon X3 sensor.

Also described herein is a configuration of the camera device for generating at least one image of surroundings, including a light guiding medium, at which an input coupling region and an image capturing unit are arranged opposite at different surfaces. In this case, the input coupling region has, as described above, at least two input coupling deflection structures, each of which is configured to couple into the light guiding medium light in a predefined spectral range, the light being incident on the respective deflection structure from a respectively predefined angle-of-incidence region from the surroundings, wherein the input coupling deflection structures are selective vis a vis different spectral ranges and angle-of-incidence regions. The light guiding medium is configured to transmit the coupled-in light from the input coupling region to the image capturing unit. The image capturing unit has at least two capture regions, each of which is configured to capture the light in the predefined spectral range coupled in by a respective one of the input coupling deflection structures, the light being incident on the respective capture region, separately according to angle-of-incidence regions, and the image capturing unit is configured to generate image data therefrom. This results in a particularly compact configuration of the camera device.

The light guiding medium can thus be embodied as a carrier unit or a carrier medium, i.e. for carrying or holding the input coupling region of the image capturing unit. In this case, the input coupling region and image capturing unit are arranged opposite at the light guiding medium, their respective surfaces for example completely overlapping. The coupled-in light can thus radiate through the light guiding medium, without being internally reflected, and impinge on the image capturing unit for capture. The light guiding medium can thus be configured so that the coupled-in light radiates through it, and for example to forward the coupled-in light to the image capturing unit. In this configuration, therefore, the respective deflection structure serves for diverting or deflecting light from the respective angle-of-incidence region in a direction of incidence for the image capturing unit. For example, the light can be deflected from an angle of 45 degrees in relation to a perpendicular to a surface of the light guiding medium to an angle of 0 degrees (perpendicular to the surface) for capture by the image capturing unit.

As described above, light which has a different spectral range than the respectively predefined spectral range and impinges on the respective deflection structure from a different angle-of-incidence region than the proceeded angle-of-incidence region is deflected to a lesser extent or is not deflected and is thus transmitted through the light guiding medium for example in an unimpeded manner. This for example light which is not deflected may also be referred to as stray light. In order then to prevent stray light from being captured by the image capturing unit in this configuration of the camera device, the image capturing unit or its capture regions can likewise be embodied as angle-selective and wavelength-selective. In order to realize the wavelength selectivity, the image capturing unit can include a color filter unit, such as is known for example from a Bayer sensor or some other color image sensor. In order to realize the angle selectivity, the image capturing unit can include a stop unit. That is to say that the capture regions can be separated from one another for example by a suitable arrangement of stops in the direction of light incidence. The arrangement of stops thus makes it possible to prevent the light that is intended for one of the capture regions from passing as stray light to another of the capture regions. It is also possible to use other suitable measures for suppressing the stray light.

Also described herein is a motor vehicle including a camera device as described above. In this case, the light guiding medium may be embodied as window pane of the motor vehicle, that is to say for example as a windshield, a side window or a rear window of the motor vehicle. The motor vehicle as described herein may be configured as an automobile, for example as a car or truck, or as a passenger bus or motorcycle.

The disclosure also includes developments of the motor vehicle described herein which have features such as those already described in association with the developments of the camera device described herein. For this reason, the corresponding developments of the motor vehicle are not described again here.

The disclosure also encompasses the combinations of the features of the embodiments described.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Reference will now be made in detail to example embodiments which are illustrated in the accompanying drawings, wherein like reference numerals refer to like elements throughout.

The embodiments explained below are example embodiments. In the example embodiments, the described components of the embodiments each constitute individual features which are to be considered independently of one another and which also develop the disclosure independently of one another. Therefore, the disclosure is also intended to encompass combinations of the features of the embodiments other than those presented. Furthermore, the described embodiments are also able to be supplemented by further features from among those described herein.

In the drawings, identical reference signs designate in each case functionally identical elements.

Figure 1:
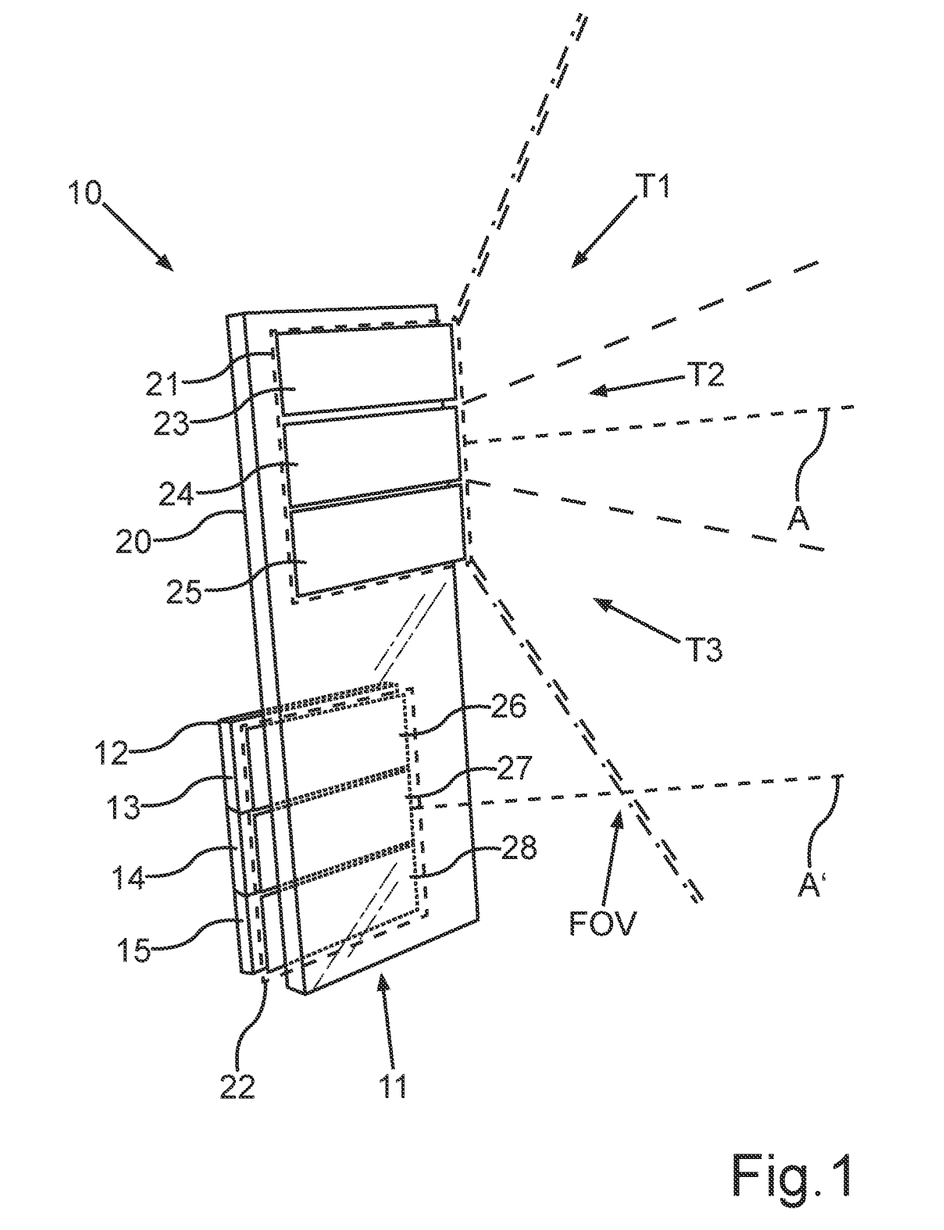
FIG. 1 is a schematic illustration of an example configuration of a camera device for capturing an enlarged field of view with just one image capturing unit.

FIG. 1 shows a schematic illustration of an example embodiment of a camera device 10 having an enlarged field of view FOV in order to generate one or more images of surroundings using just one image capturing unit 12. In FIG. 1, the image capturing unit 12 is illustrated as an image sensor, such as a CCD sensor or a CMOS sensor, for example. In order to capture the enlarged field of view FOV, a diverting unit 11 is disposed upstream of the image capturing unit 12. The diverting unit 11 thus constitutes the imaging optical unit, that is to say the lens, of the camera device 10. For example, the diverting unit 11 may be embodied as a wide-angle or multi-view lens based on holographic optical elements (HOEs), i.e. deflection structures, which are incorporated into a suitable structure, as an imaging optical unit.

An HOE is a known optical component that uses the physical effect of diffraction to bring about light guiding, in a manner similar to a lens element or a mirror, for example. An HOE has the advantage, however, that it can deflect or divert the light in an angle-selective and/or wavelength-selective manner depending on a configuration of the deflection structure. Moreover, in contrast to a lens element, an HOE can have a particularly large capture region or viewing angle of up to 170 degrees. That is to say that even light that is incident on the HOE at a steep or acute angle relative to a surface of the HOE can be diverted. Furthermore, the deflection structure of an HOE can additionally be incorporated with little outlay in a particularly space-saving manner for example into a film or a thin glass plate a few millimeters thick. These properties of an HOE are then used in order, with just one image capturing unit 12, to be able to capture the enlarged field of view FOV, for example with a viewing angle of greater than 60 degrees, for example greater than 100 degrees, for example between 0 degrees and 170 degrees, without imaging aberrations arising on the resulting image(s). For this purpose, the diverting unit 11 in accordance with FIG. 1 now includes a plurality of such deflection structures or HOEs. The latter divide the total field of view FOV into a plurality of individual fields of view or angle-of-incidence regions T1, T2, T3. Consequently, a partial region of the field of view FOV is in each case captured by the angle-of-incidence regions T1, T2, T3. For example, the angle-of-incidence regions can slightly overlap in this case. Alternatively, however, the angle-of-incidence regions T1, T2, T3 can also directly adjoin one another, as shown in FIG. 1.

In an advantageous configuration of the camera device 10 that is not shown in FIG. 1, provision can also be made for the angle-of-incidence regions T1, T2, T3 to capture separate regions in the surroundings. That is to say that the angle-of-incidence regions T1, T2, T3 may not be adjacent to one another or overlap one another.

A construction of the diverting unit 11 in accordance with FIG. 1 will now be described briefly below. The diverting unit 11 includes a light guiding medium 20 embodied as an optical waveguide. The light guiding medium 20 is illustrated as a glass plate or glass pane in FIG. 1. Alternatively, all other kinds of materials having light guiding properties, such as plastic, for example, are also conceivable for providing the light guiding medium 20. An input coupling region 21 and an output coupling region 22 are arranged at the light guiding medium 20. In this case, input coupling region 21 and output coupling region 22 are arranged at different sides or surfaces of the light guiding medium 20 in a manner separated from one another along a direction of the longitudinal extent of the light guiding medium 20.

For coupling in the light from the surroundings, the input coupling region in FIG. 1 has three input coupling deflection structures 23, 24, 25 or HOEs. The latter are arranged in planar fashion, that is to say in a plane next to one another in relation to a direction of incidence of the light from the surroundings, and thus form the input coupling region 21. Each of the input coupling deflection structures 23, 24, 25 is configured to deflect light in a predefined spectral range, the light being incident on the respective deflection structure 23, 24, 25 from one of the respectively predefined angle-of-incidence regions T1, T2, T3 from the surroundings, in such a way that the light is coupled into the light guiding medium 20. In this case, each of the input coupling deflection structures 23, 24, 25 is embodied such that it is selective vis a vis a different spectral range and angle-of-incidence region T1, T2, T3. For example, the first input coupling deflection structure 23 can be embodied such that it is selective for red light in a spectral range of approximately 470 nanometers to 780 nanometers and the angle-of-incidence region T1 with a capture angle of 55 degrees. Accordingly, the second deflection structure 24 can be embodied such that it is selective for example for green light in a spectral range of approximately 490 nanometers to 570 nanometers and the angle-of-incidence region T2 with a capture angle of 55 degrees. By contrast, the third deflection structure 25 can be embodied such that it is selective for blue light in a spectral range of approximately 430 nanometers to 490 nanometers and the angle-of-incidence region T3 with a capture angle of 55 degrees. In combination, a field of view FOV of 165 degrees would thus result for the camera device 10 in accordance with FIG. 1.

After the light has been coupled into the light guiding medium 20 by the input coupling deflection structures 23, 24, 25, it is transmitted to the output coupling region 22 by the light guiding medium 20 by internal reflection, for example total internal reflection. In this case, each of the output coupling deflection structures 26, 27, 28 is assigned respectively to one of the input coupling deflection structures 23, 24, 25. In this context, "assigned" is taken to mean that each of the output coupling deflection structures 26, 27, 28 is selective vis a vis the same spectral range as a respective one of the input coupling deflection structures 23, 24, 25. For example, the first output coupling deflection structure 26 can be assigned to the first input coupling deflection structure 23. Via the first output coupling deflection structure 26, therefore, only the light that was captured by the first input coupling deflection structure 23 is coupled out again from the light guiding medium. Analogously, for example, the second output coupling deflection structure 27 is assigned to the second input coupling deflection structure 24, such that only light that was captured by the second input coupling deflection structure 24 is coupled out from the light guiding medium 20 via the second output coupling deflection structure 27. Accordingly, the third output coupling deflection structure 28 is assigned to the third input coupling deflection structure 25, such that only light that was captured by the third input coupling deflection structure 25 is coupled out from the light guiding medium 20 via the third output coupling deflection structure 28.

In FIG. 1 the respective deflection structures are embodied as separate elements with respect to the light guiding medium 20. Alternatively, however, the deflection structures could also be incorporated directly into a surface or a volume of the light guiding medium 20, i.e. for example by being exposed or etched therein.

Finally, the image capturing unit 12 is arranged at the output coupling region 22. In a manner corresponding to the three output coupling deflection structures 26, 27, 28, the image capturing unit 12 in FIG. 1 also has three different capture regions 13, 14, 15, which capture the coupled-out light. That is to say that each of the output coupling deflection structures 26, 27, 28 is assigned to a respective capture region 13, 14, 15 of the image capturing unit 12. The respective capture region 13, 14, 15 thus captures only the coupled-out light that was coupled out from the light guiding medium 20 by the respectively assigned output coupling deflection structure 26, 27, 28. The image capturing unit 12 can then generate image data from the captured light. In this case, for example, a separate image data set is generated for each capture region 13, 14, 15. Since the deflection structures 23, 24, 25, 26, 27, 28 separate the light from the surroundings according to wavelengths and angle-of-incidence regions T1, T2, T3, in accordance with the example embodiment shown in FIG. 1, therefore, the image capturing unit 12 can generate three image data sets separated according to spectral range and angle-of-incidence region T1, T2, T3. The image data sets can then either be used as separate individual images of the surroundings or, as shown in FIG. 2, be computed by a computing unit 30 to form a common image U of the surroundings.

As shown in FIG. 1, the input coupling deflection structures 23, 24, 25 and the output coupling deflection structures 26, 27, 28 with the image capturing unit 12 lie on different optical axes A and A'. This rectification of the optical axes A and A' results from the circumstance that HOEs have the effect of being transparent for all non-associated wavelengths and angle-of-incidence regions. That is to say that light that has a different spectral range than the predefined spectral range and impinges on the respective deflection structure from a different angle-of-incidence region T1, T2, T3 than the proceeded angle-of-incidence region is not deflected. Without an offset of the optical axes A and A', light or stray light transmitted by the input coupling deflection structures 23, 24, 25 would thus be superimposed on the image capturing unit 12. In order additionally to prevent stray light from the surroundings being captured by the image capturing unit 12, provision can advantageously be made for a surface of the light guiding medium 20, outside the sections including the input coupling region 21 and the output coupling region 22, to have a protective layer. The protective layer is configured to avoid the transmission of light from the surroundings through the light guiding medium 20.

Figure 2:
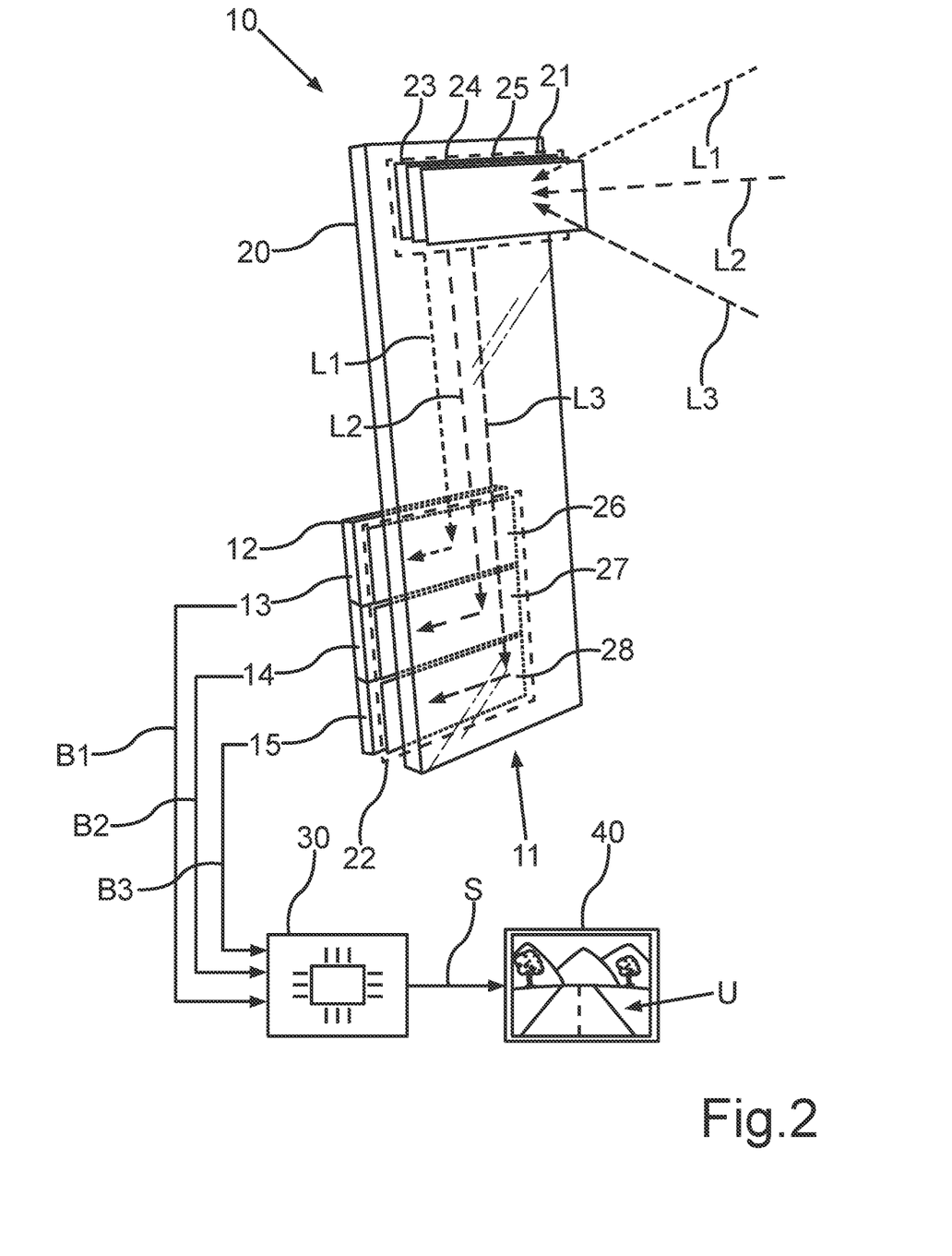
FIG. 2 is a schematic illustration of an example configuration of the camera device.

FIG. 2 then shows an alternative configuration of the diverting unit 11. Instead of being arranged in a planar fashion next to one another, the input coupling deflection structures 23, 24, 25 here are arranged serially one after another in relation to a direction of incidence of the light L1, L2, L3 from the surroundings. In this case, the areas of the input coupling deflection structures 23, 24, 25 overlap completely, for example. For example, the input coupling deflection structures 23, 24, 25 can be incorporated into a common substrate by multiple exposure, for example. Alternatively, the input coupling deflection structures 23, 24, 25 can also be incorporated in a plurality of substrates or elements, which are subsequently arranged in a manner stacked one on top of another in a sandwich design.

The generation of an image representation U with an enlarged field of view FOV by use of the camera device 10 can now also be described again with reference to FIG. 2. In this case, in FIG. 2, the light that is incident on the input coupling region 21 from the surroundings in order to generate the image U is illustrated schematically as individual light portions or light beams L1, L2, L3. In this case, a light beam L1 that has a wavelength in the red light range and is incident on the input coupling region 21 within the angle-of-incidence region T1, for example, is coupled into the light guiding medium 20 by the first input coupling deflection structure 23 and is transmitted to the output coupling region in the light guiding medium by internal reflection. The output coupling first deflection structure 26 assigned to the first input coupling deflection structure 23 is likewise selective for light having a wavelength in the red light range, such that the light beam L1 is coupled out from the light guiding medium 20 via the first output coupling deflection structure 26. In this case, the image capturing unit 12 is arranged at the output coupling region 22, the first capture region 13 of the image capturing unit being adjacent to the first output coupling deflection structure 26. Via the first capture region 13, the coupled-out light beam L1 can then be captured and the image capturing unit 12 can generate the image data B1 from the light beam L1 captured by the first capture region 13. Analogously, for example, the image data B2 and B3 can be generated respectively by light beams L2 and L3 that have a wavelength in the green light range or in the blue light range and impinge on the second or third input coupling deflection structure 24, 25 respectively in a corresponding angle-of-incidence region T2, T3. The individual image data B1, B2, B3 can subsequently be combined by a computing unit 30, which is likewise part of the camera device 10, to form the image U of the surroundings. The computing unit 30 can then drive for example a control signal S for a display unit 40, such as a display in the multimedia interface of a motor vehicle, for example, such that the image U representing the enlarged field of view FOV is displayed to a user or driver of the motor vehicle.

Figure 3:
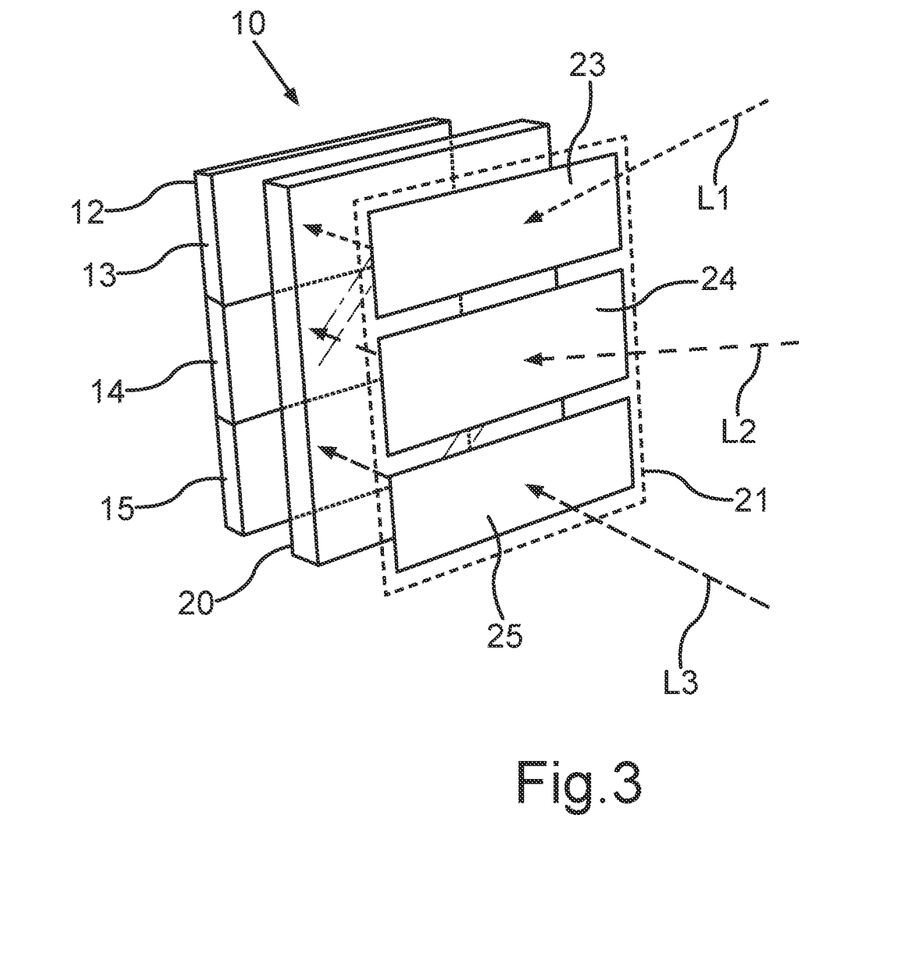
FIG. 3 is a schematic illustration of an example configuration of the camera device.

FIG. 3 shows an alternative configuration of the camera device 10. In this case, the input coupling region 21 and the image capturing unit 12 are arranged opposite at different surfaces of the light guiding medium 20, their areas completely overlapping. The light guiding medium 20 thus serves as a carrier medium for the input coupling region 21 and the image capturing unit 12. Instead of forwarding by internal reflection, in this configuration the coupled-in light L1, L2, L3 radiates through the light guiding medium 20. Consequently, the light L1, L2, L3, for example without being diverted, can be transmitted or forwarded from the input coupling region 21 to the image capturing unit 12. For this configuration the superimposition of light L1, L2, L3 of different wavelengths or angle-of-incidence regions T1, T2, T3 on the image capturing unit 12, provision is made for each of the three capture regions 13, 14, 15 of the image capturing unit 12 to be embodied in a wavelength-selective and angle-selective manner according to the respectively assigned input coupling deflection structure 23, 24, 25.

Overall, the examples show how it is possible to realize a multi-view camera with HOEs.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in *Superguide* v. *DIRECTV*, 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C. In addition, the term "and/or" includes a plurality of combinations of relevant items or any one item among a plurality of relevant items. That is, the scope of the expression or phrase "A and/or B" includes all of the following: (1) the item "A", (2) the item "B", and (3) the combination of items "A and B".

The invention claimed is:

1. A camera device, comprising:
   a light guiding medium to guide a light;
   an input coupling region disposed at the light guiding medium, the input coupling region including at least two input coupling deflection structures, each of which is configured to couple, into the light guiding medium, the light in a spectral range,
   when the light is incident on respective input coupling deflection structures, from among the at least two input coupling deflection structures, the light being incident from a respective angle-of-incidence region, from among angle-of-incidence regions, from surroundings of the camera device,
   the at least two input coupling deflection structures are selective vis a vis different spectral ranges and the angle-of-incidence regions;
   an output coupling region disposed at the light guiding medium, the output coupling region including at least two output coupling deflection structures, each of which is configured to couple out from the light guiding medium the light in the spectral range coupled in by the respective input coupling deflection structures; and
   an image capturing unit disposed at the output coupling region, the image capturing unit including at least two capture regions, each of which is configured to capture the light coupled out by respective output coupling deflection structures, from among the at least two output coupling deflection structures, and the image capturing unit being configured to generate image data based on the light coupled out by the respective output coupling deflection structures,
   wherein the light guiding medium is to transmit the light coupled in by the respective input coupling deflection structures from the input coupling region to the output coupling region by internal reflection.

2. The camera device as claimed in claim 1, further comprising a computing unit configured to generate respectively separate images from the image data generated by the image capturing unit.

3. The camera device as claimed in claim 1, further comprising a computing unit configured to generate a common image from the image data generated by the image capturing unit.

4. The camera device as claimed in claim 1, wherein
   at least one of the at least two input coupling deflection structures includes a first optical grating, and
   at least one of the two output coupling deflection structures includes a second optical grating.

5. The camera device as claimed in claim 4, wherein
   the first optical grating includes at least one of a first surface holographic grating and a first volume holographic grating, and
   the second optical grating includes at least one of a second surface holographic grating and a second volume holographic grating.

6. The camera device as claimed in claim 1, wherein
   the at least two input coupling deflection structures are integrally formed with the light guiding medium, or the at least two input coupling deflection structures are formed as a separate element with respect to the light guiding medium, and
   the at least two output coupling deflection structures are integrally formed with the light guiding medium, or the at least two output coupling deflection structures are formed as a separate element with respect to the light guiding medium.

7. The camera device as claimed in claim 1, wherein the at least two input coupling deflection structures are disposed serially one after another in relation to a direction of incidence of the light or are disposed in a planar fashion next to one another in the input coupling region.

8. The camera device as claimed in claim 1, wherein each of the input coupling deflection structures has an area which is larger than an area of a respectively assigned output coupling deflection structure among the at least two output coupling deflection structures.

9. The camera device as claimed in claim 1, wherein
   each of the input coupling deflection structures is configured as an optical grating having a focusing grating structure to deflect light beams of the light to be diverted, the light impinging on respective input coupling deflection structures, from among the at least two input coupling deflection structures, from the surroundings, to different extents based on an incidence location, such that each of the respective input coupling deflection structures focuses the light beams toward respectively assigned output coupling deflection structures among the at least two output coupling deflection structures, and
   each of the output coupling deflection structures is configured as an optical grating having a diverging grating structure to deflect the light coupled in by the respective input coupling deflection structures from the input coupling region, the light impinging on respective output coupling deflection structures, from among the at least two output coupling deflection structures, to different extents based on an incidence location, such that each of the respective output coupling deflection structures parallelizes the light beams for capture by the image capturing unit.

10. The camera device as claimed in claim 1, wherein the image capturing unit includes a color image sensor configured to capture the light coupled out by the respective output coupling deflection structures among the at least two output coupling deflection structures.

11. A camera device, comprising:
    a light guiding medium to guide a light;
    an input coupling region disposed at a first surface on a first side of the light guiding medium, the input coupling region including at least two input coupling deflection structures, each of which is configured to couple, into the light guiding medium, the light in a spectral range,
    when the light is incident on respective input coupling deflection structures, from among the at least two input coupling deflection structures, the light being incident from a respective angle-of-incidence region, from among angle-of-incidence regions, from surroundings of the camera device,
    the at least two input coupling deflection structures are selective vis a vis different spectral ranges and the angle-of-incidence regions; and an image capturing unit disposed at a second surface on a second side of the light guiding medium, opposite of the first side, the image capturing unit including at least two capture regions, each of which is configured to capture the light in the spectral range coupled in by a respective input coupling deflection structure, from among the at least two input coupling deflection structures, when the light is being incident on a respective capture region, from among the at least two capture regions, the light being incident on the respective capture region separately according to the angle-of-incidence regions, and the image capturing unit being configured to generate image data based on the light captured by the at least two capture regions, wherein the light guiding medium is to transmit the light coupled in by the respective input coupling deflection structures from the input coupling region to the image capturing unit.

12. A motor vehicle, comprising:

a window pane; and a camera device, including:

a light guiding medium to guide a light;

an input coupling region disposed at the light guiding medium, the input coupling region including at least two input coupling deflection structures, each of which is configured to couple, into the light guiding medium, the light in a spectral range, when the light is being incident on respective input coupling deflection structures, from among the at least two input coupling deflection structures, the light being incident from a respective angle-of-incidence region, from among angle-of-incidence regions, from surroundings of the camera device, the at least two input coupling deflection structures are selective vis a vis different spectral ranges and the angle-of-incidence regions;

an output coupling region disposed at the light guiding medium, the output coupling region including at least two output coupling deflection structures, each of which is configured to couple out from the light guiding medium the light in the spectral range coupled in by the respective input coupling deflection structures; and an image capturing unit disposed at the output coupling region, the image capturing unit including at least two capture regions, each of which is configured to capture the light coupled out by respective output coupling deflection structures, from among the at least two output coupling deflection structures, and the image capturing unit being configured to generate image data based on the light coupled out by the respective output coupling deflection structures, wherein the light guiding medium is formed as part of the window pane and is configured to transmit the light coupled in by the respective input coupling deflection structures from the input coupling region to the output coupling region by internal reflection.

13. The motor vehicle as claimed in claim 12, wherein the camera device further includes a computing unit configured to generate respectively separate images from the image data generated by the image capturing unit.

14. The motor vehicle as claimed in claim 12, wherein the camera device further includes a computing unit configured to generate a common image from the image data generated by the image capturing unit.

15. The motor vehicle as claimed in claim 12, wherein at least one of the at least two input coupling deflection structures includes a first optical grating, and at least one of the two output coupling deflection structures includes a second optical grating.

16. The motor vehicle as claimed in claim 15, wherein the first optical grating includes at least one of a first surface holographic grating and a first volume holographic grating, and the second optical grating includes at least one of a second surface holographic grating and a second volume holographic grating.

17. The motor vehicle as claimed in claim 12, wherein the at least two input coupling deflection structures are integrally formed with the light guiding medium, or the at least two input coupling deflection structures are formed as a separate element with respect to the light guiding medium, and the at least two output coupling deflection structures are integrally formed with the light guiding medium, or the at least two output coupling deflection structures are formed as a separate element with respect to the light guiding medium.

18. The motor vehicle as claimed in claim 12, wherein the at least two input coupling deflection structures are disposed serially one after another in relation to a direction of incidence of the light or are disposed in a planar fashion next to one another in the input coupling region.

19. The motor vehicle as claimed in claim 12, wherein each of the input coupling deflection structures has an area which is larger than an area of a respectively assigned output coupling deflection structure among the at least two output coupling deflection structures.

20. The motor vehicle as claimed in claim 12, wherein the image capturing unit includes a color image sensor configured to capture the light coupled out by the respective output coupling deflection structures among the at least two output coupling deflection structures.

* * * * *

UNITED STATES PATENT AND TRADEMARK OFFICE
CERTIFICATE OF CORRECTION

| | | |
|---|---|---|
| PATENT NO. | : 11,758,273 B2 | Page 1 of 1 |
| APPLICATION NO. | : 17/628442 | |
| DATED | : September 12, 2023 | |
| INVENTOR(S) | : Tobias Moll | |

It is certified that error appears in the above-identified patent and that said Letters Patent is hereby corrected as shown below:

In the Claims

Column 13, Lines 32-33:
In Claim 1, delete "the light guiding medium the light" and insert -- the light guiding medium, the light- --.

Signed and Sealed this
Twenty-first Day of November, 2023

*Katherine Kelly Vidal*

Katherine Kelly Vidal
*Director of the United States Patent and Trademark Office*